(12) United States Patent
Ivershen

(10) Patent No.: US 8,219,675 B2
(45) Date of Patent: Jul. 10, 2012

(54) SYSTEM AND METHOD FOR CORRELATING IP FLOWS ACROSS NETWORK ADDRESS TRANSLATION FIREWALLS

(75) Inventor: Aleksey G. Ivershen, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 150 days.

(21) Appl. No.: 12/636,144

(22) Filed: Dec. 11, 2009

(65) Prior Publication Data
US 2011/0145391 A1    Jun. 16, 2011

(51) Int. Cl.
*G06F 15/173* (2006.01)
*G06F 15/16* (2006.01)

(52) U.S. Cl. ............ 709/224; 709/223; 723/11; 723/13; 723/23

(58) Field of Classification Search .................. 709/223, 709/224; 726/11, 13, 23
See application file for complete search history.

(56) References Cited

U.S. PATENT DOCUMENTS

| | | | |
|---|---|---|---|
| 6,985,920 B2 * | 1/2006 | Bhattacharya et al. | 709/200 |
| 7,222,366 B2 * | 5/2007 | Bruton et al. | 726/23 |
| 7,386,628 B1 * | 6/2008 | Hansell et al. | 709/238 |
| 7,739,398 B1 * | 6/2010 | Shabtay | 709/232 |
| 2004/0205245 A1 * | 10/2004 | Le Pennec et al. | 709/245 |
| 2004/0260763 A1 * | 12/2004 | Bhattacharya et al. | 709/202 |
| 2010/0161795 A1 * | 6/2010 | Deridder et al. | 709/224 |

* cited by examiner

*Primary Examiner* — Aaron Strange
(74) *Attorney, Agent, or Firm* — Matthew D. Rabdau; Michael J. Fogarty, III

(57) ABSTRACT

Systems and methods are disclosed for correlating IP flows across a NAT firewall. Data packets are captured from a first interface using a monitor probe coupled to the first interface and are correlated into a first group of session records. For each of the first group of session records, a correlation key is created using data in one of the packets in the session record. Data packets are captured from a second interface using a monitor probe coupled to the second interface and are correlated into a second group of session records. For each of the second group of session records, a correlation key is created using data in one of the packets in the session record. The correlation key for one of the first group is compared to the correlation keys for each of the second group of session records to identify session records with matching correlation keys.

19 Claims, 3 Drawing Sheets

FIRST HTTP HEADER FROM FLOW 21: (301)

- 31A: GET http://m.google.com/gwt/n?u=http%3A%2F%2Fwww.gucci.com%2Fus%2F HTTP/1.1
- Accept-Language:en
- X-Wap-Proxy-Cookie:none
- Accept:text/html,image/vnd.wap.wbmp,image/png,image/jpeg,image/gif (...)
- Accept-Charset:windows-1252;q=1.0,utf-8;q=1.0,utf-16;q=1.0,iso-8859-1;(...)
- 34A: x-wap-profile: "http://wap.samsungmobile.com/uaprof/A707UAProf.xml"
- 32A: Host: m.google.com
- User-Agent: SAMSUNG-SGH-A707/1.0 SHP/VPP/R5 NetFront/3.3 SMM-MMS/1.2.0 (...)
- Proxy-Connection: Keep-Alive
- Accept-Encoding: deflate, gzip
- 33A: Referer: http://m.google.com/gwt/n?q=gucci&source=m&hl=en&ei=IhesR4iINJ (...)
- 35A: Cookie: gwt=LTE4MjMzMDc1NzI4MjAzNzk3NzQgNhwZPzU/Oz8/SD8/IRk/UT8/P1FaPRo (...)

FIG. 3A

FIRST HTTP HEADER FROM FLOW 22: (302)

- 31B: GET /gwt/n?u=http%3A%2F%2Fwww.gucci.com%2Fus%2F HTTP/1.1
- 32B: Host: m.google.com
- Accept: text/html,image/vnd.wap.wbmp,image/png,image/jpeg,image/gif (...)
- Accept-Charset: windows-1252;q=1.0,utf-8;q=1.0,utf-16;q=1.0,iso-8859-1; (...)
- Accept-Encoding: gzip, deflate
- Accept-Language: en
- 35B: Cookie: gwt=LTE4MjMzMDc1NzI4MjAzNzk3NzQgNhwZPzU/Oz8/SD8/IRk/UT8/P1FaPRo (...)
- 33B: Referer: http://m.google.com/gwt/n?q=gucci&source=m&hl=en&ei=IhesR4iINJ (...)
- 34B: User-Agent: SAMSUNG-SGH-A707/1.0 SHP/VPP/R5 NetFront/3.3 SMM-MMS/1.2.0 (...)
- x-wap-profile: "http://wap.samsungmobile.com/uaprof/A707UAProf.xml"
- X-Wap-Proxy-Cookie: none
- 303:
  - x-up-devcap-smartdialing: 0
  - x-up-devcap-iscolor: 1
  - x-up-devcap-screendepth: 16
  - x-up-devcap-numsoftkeys: 2
  - x-up-devcap-charset: US-ASCII,UTF-8
  - x-up-devcap-screenpixels: 240,320
  - x-up-devcap-accept-language: en,fr,de,es,it,sv,pt,el
  - x-up-subno: swc_108af7fc8ee_vmag.mycingular.net
  - Via: 1.1 alnmagr1fe05WAP2-mbl

FIG. 3B

SYSTEM AND METHOD FOR CORRELATING IP FLOWS ACROSS NETWORK ADDRESS TRANSLATION FIREWALLS

TECHNICAL FIELD

Embodiments are directed, in general, to correlating packets in a telecommunications network and, more specifically, to correlating packets with address information that has been modified by a Network Address Translation (NAT) firewall.

BACKGROUND

Monitoring and troubleshooting telecommunications networks typically requires end-to-end tracking of user sessions. Each session comprises packets or IP packets sent over multiple legs or hops starting at a network access point and traversing the telecommunications networks through gateways to an application server or data server. The packets on each leg are identified as belonging to a specific session, and all the packets for each session combined into a session record. A service provider can verify that the data network is working properly by tracking user calls all the way through the networks from the user equipment to a destination server.

This task is complicated by the presence of Network Address Translation (NAT) firewalls in telecommunications networks. The NAT firewalls may be part of a router, server or other node in the telecommunications network. The NAT firewalls modify inbound and outbound network addresses in IP packet headers and, for some application protocols, perform other packet modifications to data in the OSI (Open Systems Interconnection) layers.

NAT firewalls may be used for network masquerading, for example, hiding an entire private address space of an operator and only exposing the public IP addresses of the NAT device to outside devices. As a result, all packets from the private network appear to have originated from the NAT device since the actual IP address of devices behind the NAT are hidden from outside devices. Internally, NAT functionality is typically implemented via dynamic address and port number translation tables.

The NAT firewall provides numerous advantages in the telecommunications network. A local network on one side of the NAT firewall can use just one IP address as far as outside world is concerned. The local network using the single NAT IP address does not require its Internet Service Provider (ISP) to reserve a range of addresses for each of the devices in the local network. Also, addresses within the local network can be changed without needing to notify other devices on the other side of the NAT firewall, which continue use of the address of the NAT gateway.

However, network monitoring devices that capture or analyze packets from legs on opposite sides of a NAT firewall are unable to use packet address information to determine which IP packets are associated with each other because the NAT firewall modifies the packets address information. For outgoing packets, the NAT firewall replaces the source IP address/port number of every outgoing packet to the NAT IP address and a new port number. Remote clients and servers respond to these outgoing packets using the NAT's IP address and the new port number as a destination address. The NAT stores every pair of source IP address/port number and NAT IP address/new port number in a NAT translation table. For incoming packets, the NAT firewall replaces the NAT IP address/new port number in the destination fields of every incoming packet with the corresponding source IP address/port number stored in NAT table.

Monitoring devices deployed at interfaces or on legs that are on opposite sides of the NAT firewall cannot correlate flows on those interfaces or legs using IP address information since addresses and ports in the packets on opposite sides of the NAT firewall are quite different and, therefore, typical packet association mechanisms will fail.

SUMMARY

Embodiments of the network monitoring system described herein provide a system and network for correlating data packets for multiple hop data calls across multiple networks. The present disclosure provides a system and method for correlation of data packets across a NAT firewall that modifies IP address and other data in the packets. In a preferred embodiment, passive collection of OSI Layer 5 (L5) or Layer 7 (L7) data is used to correlate data packets without requiring NAT translation table data.

Embodiments of the system and method disclosed herein offer a simple working method for correlation of pre-NAT and post-NAT data flows. In addition to simplicity, embodiments do not require access to NAT translation tables, and, with a few exceptions noted below, are essentially independent of the application protocols used in the flows.

Embodiments of the network monitoring system disclosed herein takes advantage of the invariant parts of packets that pass through a NAT firewall. For example, in email packets, the L7 data is shipped as-is after the packet's address information has been translated. This L7 data can be used to create a checksum key using a Cyclic Redundancy Code (CRC) 32 or Message-Digest algorithm 5 (MD5) value, for example. The checksum key can then be used to identify related packets on each side of the NAT firewall. The L7 data in the pre-NAT data packet is not modified in the NAT translation and, therefore, the L7 data in the corresponding post-NAT data packet will be the same as the pre-NAT L7 data. Accordingly, the checksum keys for the pre-NAT and post-NAT packets will be created using the same data and, therefore, should be identical. By comparing checksum keys for packets in the pre-NAT and post-NAT data flows, matching packet checksum keys can be used to identify related packets. Using a known checksum key from a packet on the first side of the NAT firewall, the checksum keys for all packets with a timestamp within a specified time on the second side of the NAT firewall can be analyzed. For example, to account for packet transit time, firewall delay and clock errors, the checksum keys for all packets on the second side of the NAT firewall having a timestamp within milliseconds of the first-side packet are analyzed.

On each side of the NAT firewall, related packets can be correlated using a 5-tuple association mechanism, which is an IP correlation key that consists of 5 parts—Server IP address, Client IP address, source port, destination port, and Layer 4 Protocol (TCP or UDP or SCTP). The related packets can be combined into a flow record for a particular session. Using the system and method disclosed herein, the checksum key for the first packet detected for each flow record can be used to determine which flow records are related. The related flow records from multiple links on both sides of the NAT firewall can be combined into a session record for the call, which can be used to evaluate the network performance.

In some protocols, such as HTTP, the L5/L7 data may be changed by a NAT-enabled WAP Gateway. In such cases, the L5/L7 data cannot be used to create the checksum key because changes in the L5/L7 data will result in different checksums. In such cases, other portions of the packets must be used to create the checksum key. For example, in HTTP, certain header tags remain the same the WAP Gateway, but other tags are modified, added or deleted. By identifying which header tags remain the same, those tags can be used to create the checksum key.

The use of a checksum key to identify related packets provides an advantage in processing speed. Instead of having to compare the entire payload or tags in the pre-NAT and post-NAT packets, just the 64-bit checksum keys need to be compared. This provides faster results using less processor time. Once matching checksums are identified, the actual payload/tag data in the packets can be compared to confirm the match, if desired. Alternatively, the payload sizes of the respective matching packets can be compared to confirm the match.

BRIEF DESCRIPTION OF THE DRAWINGS

Figure 1:
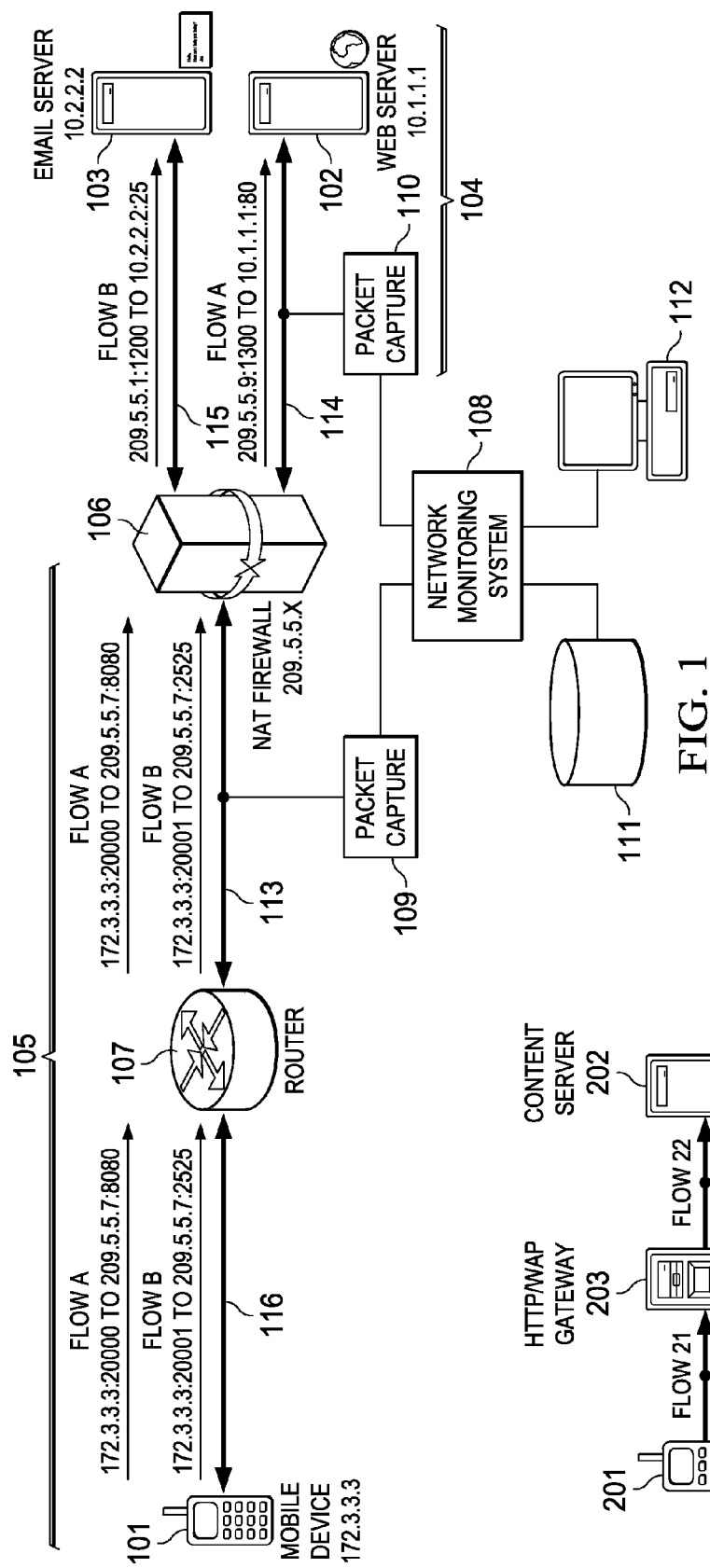
Figure 2:
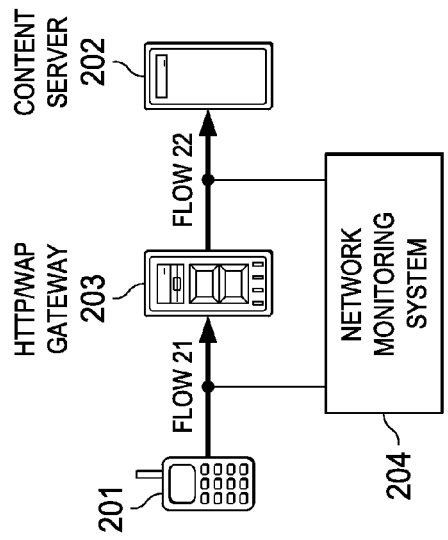
Figure 4:
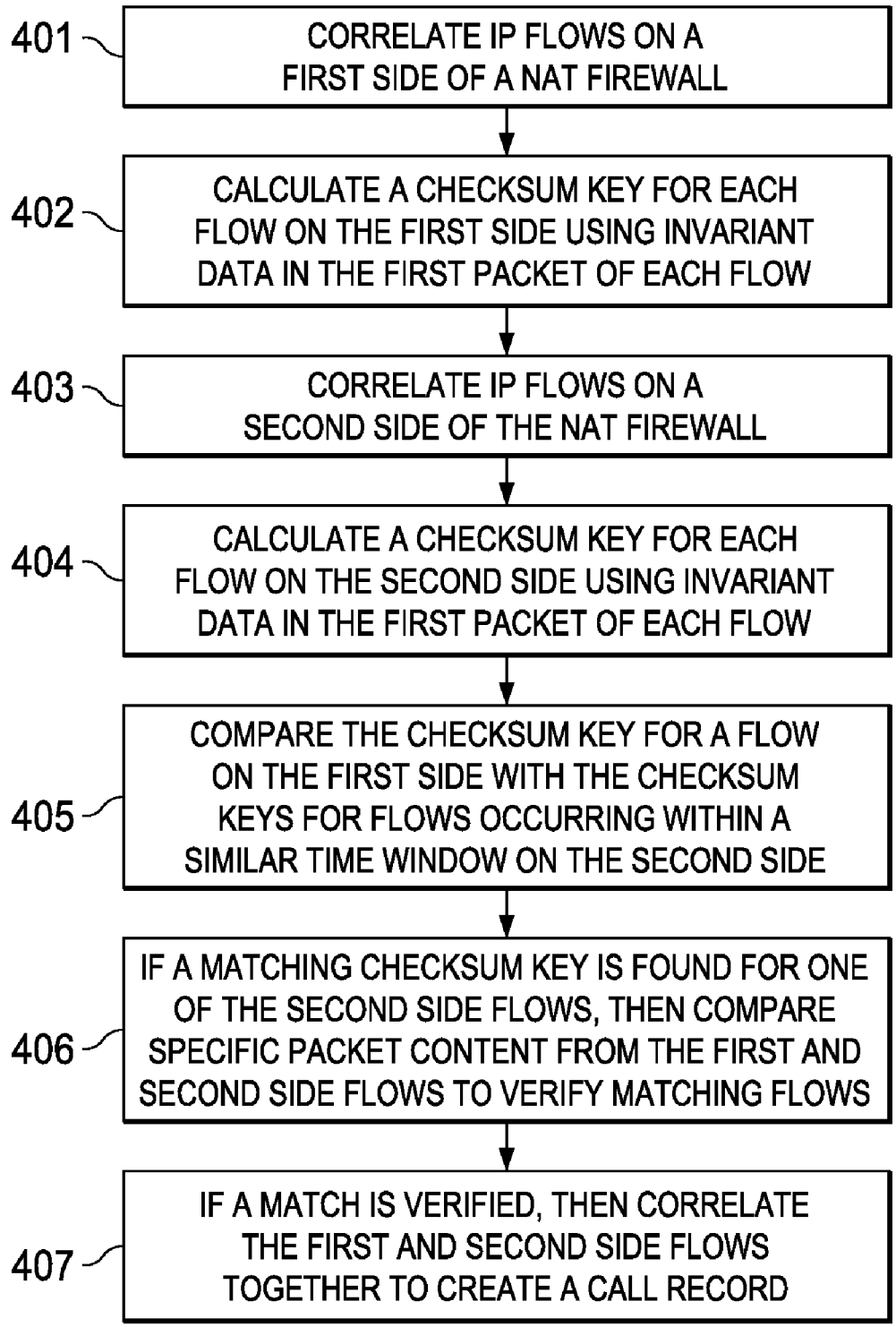

Having thus described the system and method in general terms, reference will now be made to the accompanying drawings, which are not necessarily drawn to scale, and wherein:

FIG. 1 illustrates a network monitoring system coupled to telecommunications networks according to an exemplary embodiment;

FIG. 2 illustrates a network monitoring system coupled to a telecommunication network according to another exemplary embodiment;

FIGS. 3A and 3B illustrate HTTP header data from packets before and after NAT translation; and FIG. 4 is a flowchart illustrating an exemplary embodiment of a method for correlating IP flows.

DETAILED DESCRIPTION

The system and method now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates two message flows, A and B, originating from mobile device 101 and traversing telecommunications networks 104 and 105. Message flow A is directed to web server 102, and message flow B is directed to email server 103. Mobile device 101 is assigned IP address 172.3.3.3. Flow A is associated with port number 20000 on mobile device 101, and flow B is associated with port number 20001. These port numbers and the mobile device's assigned IP address are used as the source IP address for packets sent in message flows A and B. Web server 102 and email server 103 are part of local area network or private network 104, which is accessed from the public network or Internet 105 via NAT Firewall/WAP Gateway (NATF/WAPG) 106. Web server 102 is assigned IP address 10.1.1.1 within network 104, and email server 103 is assigned IP address 10.2.2.2 within network 104.

The actual IP addresses of web server 102 and email server 103 are not known to devices on public network 105. Instead, devices on public network 105, such as mobile device 101, access web server 102 and email server 103 using the public IP addresses, such as 209.5.5.7, and port numbers assigned to NATF/WAPG 106. Mobile device 101 addresses packets in flows A and B using destination IP address 209.5.5.7 and port number 8080 for packets that are directed to web server 102 or port number 2525 for packets that are directed to email server 103. Router 107 receives the packets in flows A and B and, using the destination IP address, forwards the packets to NATF/WAPG 106. Router 107 and mobile device 101 do not need to know the actual addresses of web server 102 or email server 103 as long as they know and use the public IP address for NATF/WAPG 106 and the appropriate port numbers assigned to web server 102 and email server 103. It will be understood that numerous other devices or nodes may be deployed on network 105, such as additional network routers, Serving GPRS Support Nodes (SGSN), Gateway GPRS Support Nodes (GGSN), or other core network nodes. Such additional nodes or devices would operate to forward packets in flows A and B in the same manner as router 107 and would not need to know the actual IP address assigned to web server 102 and email server 103 by network 104.

NATF/WAPG 106 uses a NAT translation table, such as Table 1 below, to determine the IP address to use on network 104 for the incoming packets in flows A and B.

TABLE 1

| NAT Translation Table | |
| --- | --- |
| Destination IP address/port number in incoming packets from network 105 | Corresponding destination IP address/port number on private network 104 |
| 209.5.5.7:8080 | 10.1.1.1:80 |
| 209.5.5.7:2525 | 10.2.2.2:25 |

As illustrated in FIG. 1, NATF/WAPG 106 modifies the source and destination address information in the packets of flows A and B. For example, in flow A, the source and destination IP address is 172.3.3.3 and 209.5.5.7, respectively, in network 105. However, in network 104, the source and destination IP address for packets in flow A are changed by NATF/WAPG 106 to 209.5.5.9 and 10.1.1.1, respectively. The port numbers for the incoming and outgoing packets at NATF/WAPG 106 are also changed.

Network monitoring system 108 may be used to monitor the performance of networks 104 and 105. Monitoring system 108 captures data packets that are transported across networks 104 and 105. In one embodiment, packet capture devices 109, 110 which are non-intrusively coupled to network interfaces to capture substantially all of the packets transmitted on the interfaces. Packet capture devices 109, 110 may be coupled to one or more network interface. Packet capture devices 109, 110 may be part of network monitoring system 108, such as a line interface card on system 108, or may be separate components as shown in FIG. 1.

Monitoring system 108 preferably comprise one or more processors running one or more software applications that collect, correlate and analyze media and signaling data from telecommunication networks. Monitoring system 108 may provide protocol analyzer, session analyzer, and/or traffic analyzer functionality that provides OSI layer 2 to layer 7 troubleshooting by characterizing IP traffic by links, applications and servers on networks 104 and 105. Such functionality is provided, for example, by the Iris Analyzer toolset available from Tektronix, Inc. Packet capture devices 109, 110 may be high-speed, high-density 10GE probes that are optimized to handle high bandwidth IP traffic, such as the GeoProbe G10 available from Tektronix, Inc. Users may access data from monitoring system 108 via user interface 112, such as the IrisView configurable software framework that provides a single, integrated platform for all applications, including feeds to customer experience management systems and operation support system (OSS) and business support system (BSS) applications, which is also available from Tektronix, Inc. Monitoring system 108 may further comprise internal or external memory 111 for storing captured data packets, user session data, and configuration information. In one embodiment, monitoring system 108 captures and correlates the packets associated with flows A and B from one or more of interfaces 113-116.

Packet capture device 109 captures substantially all of the packets on interface 113, and packet capture device 110 captures substantially all of the packets on interface 114. As discussed above, NATF/WAPG 106 modifies the address information in the data packets that is passes between networks. As a result, monitoring system 108 cannot use the source or destination address to correlate the packets on interfaces 113 and 114 since the IP addresses and ports are quite different one each interface for related messages. The routing table used by NATF/WAPG 106, such as Table 1, could be used to correlate messages on interfaces 113 and 114, but this information may not be available to monitoring system 108. Even if the NAT translation table data was available, monitoring system 108 would require immediate notification of updates or changes to the translation table in order to correlate the packets on legs 113 and 114.

Preferably, instead of using IP address data, monitoring system 108 would use an invariant correlation key in the flow that is not violated during NAT firewall traversal. Data in the OSI layers may be used to correlate packets across a NAT firewall. Some OSI layers, such as the layer 3 and 4 headers of the flow, cannot be used as a key due to IP address and port number changes as the message traverse the networks. However, in one embodiment layer 5 and 7 data may be used to correlate packets.

At each monitoring point 109, 110 in the networks, the captured IP flows are correlated using a typical 5-tuple association mechanism into a flow record structure for each monitored interface. On interface 113, for example, packet capture device 109 creates a flow record beginning when an observed flow starts and completed when the flow ends. For example, when "TCP SYN" is observed the flow record is started and all related messages on interface 113 are combined into a single flow record until "TCP FIN" is observed and the sequence completes. When the first data packet in the flow is observed to be carrying L5/L7 data, the monitoring system 108 or packet capture device 109 calculates a checksum key (CHKEY) over the invariant L5/L7 portion of the packet and stores the CHKEY value as a correlation key. Similarly, packet capture device 110 and monitoring system 108 correlate individual flow records on interface 114 and calculate a CHKEY for the first packet detected to be carrying L5/L7 data. The checksum key CHKEY may be created as a CRC32 or MD5 value, or using any other applicable technique. In one embodiment, the checksum key is a 64-bit number. In other embodiments, the checksum key may be a 32-bit or 128-bit number. It will be understood that the checksum keys may be a number of any appropriate size depending, for example, upon the number of packets to be compared, the desired speed at which the comparison is completed, the size of the payload/tags used to create the checksum key, or any other factor.

Monitoring system 108 can then pull together two or more legs of the session on demand. Starting with a first one of the legs, such as the session flow and CHKEY created by probe 109 on interface 113, the other probe 110 is queried with the CHKEY, flow starting timestamp, and L7 protocol from the first leg of the flow. The second probe 110, searches for a session that matches these parameters. The search on the second probe should look for a flow start timestamp that is within a few milliseconds of the beginning of the flow on the first probe. This allows for timestamp drift among the probes and network travel time across interfaces 113, 114 and NATF/WAPG 106. If a match is found, two session flows are successfully correlated together into a single call record.

If more than one match is found, then false positives can be identified and discarded by comparing other properties of the flow, such as, for example, the closest flow duration or an exact HTTP URI match.

In a preferred embodiment, the checksum is calculated over the invariant part of the payload. While NAT firewalls typically do not modify L5/L7 contents, in some cases this is not true. A NAT firewall may be running an Application Layer Gateway (ALG) software module, for example, that updates any payload data made invalid by address translation. The classic case for this situation is the FTP protocol, wherein communication ports in the FTP session setup must be updated. Another case is a wireless HTTP/WAP proxy, which not only performs NAT functions, but also heavily reformats the HTTP headers and performs compression/decompression of HTTP binary data for more efficient wireless bandwidth usage. In both of these cases the method proposed herein works as long as checksum is calculated over the portion of the data packet that does not change.

In most protocols, such as POP3, SMTP, and peer-to-peer protocols, the NAT firewall does not modify the data in the L7 payload. However, in other protocols, such as HTTP and FTP, the packet data is modified in the NAT firewall. For example, the header of HTTP packets is significantly modified and the payload of FTP packets may be modified. For protocols such as HTTP and FTP, the checksum key is calculated using portions of the packets that are not modified.

FIG. 2 illustrates mobile device 201 accessing a page from server 202 via HTTP/WAP gateway 203. Flow 21 represents data packets sent from mobile device 201 to HTTP/WAP gateway 203. Flow 22 represents data packets sent from HTTP/WAP gateway 203 to server 202. Network monitoring system 204 captures packets from flows 21 and 22. HTTP/WAP gateway 203 reformats the HTTP header of packets in flow 21 to create the packets in flow 22.

FIGS. 3A and 3B illustrate HTTP headers captured from flows 21 and 22 of FIG. 2, which represent two different legs of the same call. FIG. 3A illustrates the first HTTP header 301 captured for flow 21 on the first leg of the call. FIG. 3B illustrates the first HTTP header 302 captured for flow 22 on the second leg of the call. As shown by comparing FIGS. 3A and 3B, HTTP/WAP gateway 203 reformats the HTTP header extensively. In particular, HTPP/WAP gateway 203 adds user equipment (UE) capabilities tags 303 for mobile device 201. Gateway 203 also updates the server response header, and usually compresses the packet contents for delivery over the air interface.

FIGS. 3A and 3B show that five headers remain constant during the NAT traversal: Request Method ("GET") 31A/31B, Host 32A/32B, URI 33A/33B, UE Profile (x-wap-profile) 34A/34B, and Cookie 35A/35B. Therefore, a correlation key can be created using these invariant portions of the HTTP header. For example, CHKEY may be created from [Request Method+Host+URI+x-wap-profile] in the first HTTP headers in each flow 21, 22. The Cookie header may also be added to the checksum to reduce false positives.

For application protocols that get modified during NAT traversal (such as HTTP/WAP and FTP) more complex logic must be employed, such as by using portions of the headers to create the checksum as shown above, to produce correct results.

For other application protocols that employ a simple and constant handshake in the beginning of the communication—for example, protocols that exchange "HELLO" strings—the method should be modified to checksum the first packet after the handshake is complete. Otherwise, each flow using the handshake protocol would have the same checksum because the handshake is the same for each flow. For example, if a protocol is constant for all connections, such as Telnet, too many false positive matches will result if the checksum key is created from the first packet in each flow. In such cases, the second or later packet must be used to create the checksum key to ensure unique values for the checksums.

Although the examples illustrated herein are directed to data packets exchanged from a mobile device to a server (i.e. in an "upstream" direction), it will be understood that the methods and systems disclosed herein are equally useful for matching data packets and session flows traveling in the opposite direction from the server to the mobile device (i.e. in a "downstream" direction).

In a telecommunications network, thousands of flows may pass though the NAT firewall within milliseconds. Embodiments of the systems and methods disclosed herein allow for fast identification of matching packets and flows using the 64-bit checksum keys, which are smaller than the payload data or tags that would otherwise need to be compared. The packets for each flow can be tied together and tied to control signaling for the flow, which allows for further detailed end-to-end analysis of an entire call.

Once a packet has been tied to an existing session, or a session has been tied to an existing call record, those packets and sessions do not have to be checked again for matches to new flows. The monitoring system does not need to calculate or check the checksum for known packets. By minimizing the number of packets that need to checked, the monitoring system can increase the speed at which the session flow records are created.

FIG. 4 is a flowchart illustrating an exemplary embodiment of a method for correlating IP flows. In step 401, the IP flows on a first side of a NAT firewall are correlated. The IP flows may be correlated using a 5-tuple association method to identify related packets. Related packets are correlated together into a session flow or call record. The packets may be captured from a first interface coupled to the NAT firewall, wherein the interface carries packets prior to NAT translation. The packets may be captured by a network monitoring system.

In step 402, a checksum key is calculated for each IP flow on the first side. The checksum key is calculated using invariant data in the first packet of each flow. In one embodiment, the invariant data is carried in the OSI Layer 5 or Layer 7 payload. In such embodiments, the NAT firewall does not modify the L5 or L7 data during packet translation for the protocol in use. In other embodiments, the invariant data comprises header tags that are not modified during NAT translation for the protocol in use. The checksum key may calculated as a 64-bit CRC32 or MD5 value or any other appropriate checksum value.

In alternative embodiments, the checksum key is calculated using invariant data in a second or later packet in the IP flow. Such alternate embodiments may be used, for example, when a protocol uses the same handshake data in each of the first packets for all flows.

Steps 403 and 404 are similar to steps 401 and 402, respectively, but are applied to packets on a second side of the NAT firewall, such as packets captured from a second interface coupled to the NAT firewall, wherein the interface carries packets after NAT translation.

In step 405, the checksum key for an IP flow on the first side of the NAT firewall is compared to the checksum keys for flows on the second side of the NAT firewall. The flows that are used for comparison on the second side may be limited by using only flows or packets occurring within a time window that is close to or similar to the timestamp of the first-side packet.

In step 406, if a matching checksum key is found for one of the second side flows, then specific packet content from the first and second side flows is compared to verify that the flows match. In step 407, if a match is verified, then the first and second side flows are correlated or combined together to create a call record.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system for monitoring IP flows across a Network Address Translation (NAT) firewall, comprising:
    a first monitor probe coupled to an interface on a first side of the NAT firewall, the first monitor probe configured to capture data packets from the interface on the first side of the NAT firewall and to correlate the data packets into a first group of session records;
    a second monitor probe coupled to an interface on a second side of the NAT firewall, the second monitor probe configured to capture data packets from the interface on the second side of the NAT firewall and to correlate the data packets into a second group of session records; and
    a processor coupled to the first and second monitor probes, the processor configured to calculate checksum keys for the first and second groups of session records, the checksum keys based upon an invariant portion of the session records, the invariant portion corresponding to a portion that is not modified by translation in the NAT firewall, the invariant portion including data from each of: a Request Method, a Host, a URI, and a UE Profile header.

2. The system of claim 1, wherein the processor further compares a first checksum key for one of the first group of session records against the checksum keys for the second group of session records to identify matching checksum keys.

3. The system of claim 2, wherein the processor combines a session record from the first group of session records with a session record from the second group of session records, wherein both session records have the same checksum key.

4. The system of claim 1, wherein the checksum key is a Cyclic Redundancy Code (CRC) 32 or Message-Digest algorithm 5 (MD5) value.

5. The system of claim 1, wherein the invariant portion of the session record comprises OSI Layer 5 or Layer 7 data.

6. The system of claim 1, wherein the invariant portion of the session record comprises header tags.

7. The system of claim 1, wherein the invariant portion further includes data from a cookie.

8. A method for correlating IP flows, comprising:
    capturing packets from a first interface using a monitor probe coupled to the first interface;
    correlating the packets captured from the first interface into a first group of session records;

determining that a packet within the first group of session records is not a protocol handshake packet and, at least in part in response to the determination, creating a correlation key using data in the packet;

capturing packets from a second interface using a monitor probe coupled to the second interface;

correlating the packets captured from the second interface into a second group of session records;

determining that a packet within the second group of session records is not a protocol handshake packet and, at least in part in response to the determination, creating a correlation key using data in the packet; and comparing a correlation key for one of the first group to the correlation keys for each of the second group of session records to identify session records with matching correlation keys, wherein the correlation keys are created using data including each of: a Request Method, a Host, a URI, and a UE Profile header.

9. The method of claim 8, wherein the first and second interfaces are coupled to a Network Address Translation (NAT) firewall, and wherein packets are received at the NAT firewall on the first interface and are transmitted from the NAT firewall on the second interface.

10. The method of claim 9 wherein data used to create the correlation key is not modified by the NAT firewall.

11. The method of claim 10, wherein the data is OSI Layer 5 or Layer 7 data.

12. The method of claim 10, wherein the data is header tag data.

13. The method of claim 8, wherein the correlation keys are created using data in a first packet in each session record.

14. The method of claim 8, wherein the correlation keys used for comparison in the second group of session records selected based upon a time-stamp of a packet within session records.

15. The method of claim 8, wherein each correlation key is time-stamped based upon the packet used to calculate the correlation key.

16. The method of claim 15, wherein a correlation key is compared to other correlation keys selected for comparison based upon the correlation key's time-stamp being within a selected time window.

17. A computer program product that includes a non-transitory computer readable medium useable by a network monitoring device, the medium having stored thereon a sequence of instructions which, when executed by the network monitoring device, cause the network monitoring device to:

capture packets from a first interface using a monitor probe coupled to the first interface;

correlate the packets captured from the first interface into a first group of session records;

for each of the first group of session records, create a correlation key using data in one of the packets in the session record and time-stamping the correlation key;

capture packets from a second interface using a monitor probe coupled to the second interface;

correlate the packets captured from the second interface into a second group of session records;

for each of the second group of session records, create a correlation key using data in one of the packets in the session record and time-stamping the correlation key;

compare a correlation key for one of the first group to the correlation keys for each of a subset of the second group of session records to identify session records with matching correlation keys, the subset of the second group of session records selected based upon the correlation key's time-stamp being within a time window, wherein the correlation keys are created using data including each of: a Request Method, a Host, a URI, and a UE Profile header.

18. The computer program product of claim 17, wherein the first and second interfaces are coupled to a Network Address Translation (NAT) firewall, wherein packets are received at the NAT firewall on the first interface and are transmitted from the NAT firewall on the second interface, and wherein data used to create the correlation key is not modified by the NAT firewall.

19. The computer program product of claim 18, wherein the data is OSI Layer 5 or Layer 7 data or header tag data.

\* \* \* \* \*